(12) United States Patent
Canada et al.

(10) Patent No.: US 11,438,339 B2
(45) Date of Patent: Sep. 6, 2022

(54) METHOD AND SYSTEM FOR SYNCHRONOUSLY GENERATED SECURITY WAIVER INTERFACE

(71) Applicant: Ventech Solutions, Inc., Columbus, OH (US)

(72) Inventors: Matthew Canada, Rosedale, MD (US); Jerry Allen Craig, II, Knoxville, TN (US); Kathrine Dass, Severna Park, MD (US); Raja Krishnamurthy, Lewis Center, OH (US); David Anthony Rigsby, Heath, OH (US); Richard Nathan Toney, Windsor Mill, MD (US); Stephen J. Veneruso, Columbus, OH (US)

(73) Assignee: Ventech Solutions, Inc., Columbus, OH (US)

( * ) Notice: Subject to any disclaimer, the term of this patent is extended or adjusted under 35 U.S.C. 154(b) by 289 days.

(21) Appl. No.: 16/534,904

(22) Filed: Aug. 7, 2019

(65) Prior Publication Data
US 2021/0044593 A1 Feb. 11, 2021

(51) Int. Cl.
*H04L 9/40* (2022.01)

(52) U.S. Cl.
CPC ........ *H04L 63/102* (2013.01); *H04L 63/0884* (2013.01); *H04L 63/20* (2013.01)

(58) Field of Classification Search
CPC .... H04L 63/102; H04L 63/0884; H04L 63/20
USPC .......................................................... 726/4
See application file for complete search history.

(56) References Cited

U.S. PATENT DOCUMENTS

| | | | |
|---|---|---|---|
| 8,806,647 B1 * | 8/2014 | Daswani | H04L 63/145 713/168 |
| 2003/0229808 A1 * | 12/2003 | Heintz | H04L 63/20 726/23 |
| 2006/0230282 A1 * | 10/2006 | Hausler | G06F 21/6218 713/182 |
| 2007/0005987 A1 * | 1/2007 | Durham | H04W 12/128 713/185 |

(Continued)

OTHER PUBLICATIONS

Carranza et al. "Brokering Policies and Execution Monitors for IoT Middleware", 2019 SACMAT proceedings. (Year: 2019).*

(Continued)

*Primary Examiner* — Khalil Naghdali
(74) *Attorney, Agent, or Firm* — Mahamedi IP Law LLP

(57) ABSTRACT

A method and system of rendering security events in execution of a software application in a communication network. The method comprises receiving, at a memory of the server computing device, a waiver parameter specification identifying at least one waiver parameter in association with at least one recipient client device of the plurality of client computing devices, the at least one waiver parameter based at least in part on an expected security event in the software application execution; during concurrent execution, in a processor of the server computing device, of object code of the software application, generating at least one waiver task automaton that monitors for the at least one waiver parameter; and generating, based on the monitoring, at a client interface of the at least one recipient communication device, a waiver notification interface in accordance with concurrent execution.

16 Claims, 3 Drawing Sheets

(56) References Cited

U.S. PATENT DOCUMENTS

| | | | |
|---|---|---|---|
| 2011/0145920 A1* | 6/2011 | Mahaffey | H04W 12/12 |
| | | | 726/22 |
| 2012/0110174 A1* | 5/2012 | Wootton | H04L 63/1416 |
| | | | 709/224 |
| 2013/0227695 A1 | 8/2013 | Mohanakrishnan | |
| 2013/0232472 A1 | 9/2013 | Korner | |
| 2013/0283336 A1* | 10/2013 | Macy | G06F 21/577 |
| | | | 726/1 |
| 2013/0290322 A1 | 10/2013 | Prosnitz | |
| 2015/0089385 A1 | 3/2015 | Radhakrishnan | |
| 2016/0099963 A1* | 4/2016 | Mahaffey | G06F 21/554 |
| | | | 726/25 |
| 2017/0329466 A1 | 11/2017 | Krenkler | |
| 2019/0311134 A1* | 10/2019 | Mahaffey | H04L 63/0227 |

OTHER PUBLICATIONS

Krupp et al. 2017 IEEE Transactions on Dependable and Secure Computing, vol. 14, No. 4, "SPE: Security and Privacy Enhancement Framework for Mobile Devices", pp. 433-446 (Year: 2017).*
Krupp et al. 2017 IEEE Transactions on Dependable and Secure Computing, "SPE: Security and Privacy Enhancement Framework for Mobile Devices", pp. 433-446 (Year: 2017).*
Onarlioglu et al., 2016 46th Annual IEEE/IFIP International Conference on Dependable Systems and Networks, "Overhaul: Input-Driven Access Control for Better Privacy on Traditional Operating Systems", pp. 443-454 (Year: 2016).*

* cited by examiner

300

Receiving, at a memory of the server computing device, a specification identifying at least one waiver parameter in association with at least one recipient client computing device, the at least one waiver parameter based at least in part on an expected result from execution of the software application  310

Generating, by the processor during execution of the software application, a waiver task automaton representative of the at least one waiver parameter to monitor for the at least one waiver parameter during the concurrent execution  320

Generating, during the concurrent execution, at a client interface of the at least one recipient communication device, a waiver notification interface in accordance with concurrent execution  330

FIG. 3

METHOD AND SYSTEM FOR SYNCHRONOUSLY GENERATED SECURITY WAIVER INTERFACE

TECHNICAL FIELD

The disclosure herein relates to security aspects in execution of software system applications within a networked communication and computing system.

BACKGROUND

Protection of safety-critical software platform infrastructures and systems employed in healthcare, telecommunications, banking, and other commercial and industrial uses remains a major challenge. In particular, cyberattacks can be unpredictable, and intended to compromise or inhibit secure operation of an infrastructure or a critical component within the infrastructure. Computer viruses, trojans, hackers, cryptographic key recovery attacks, malicious executables and bots may present a constant threat to users of computers connected to public computer networks such as the Internet and also private networks such as corporate computer networks. In response to these threats, enterprise organizations may deploy antivirus software and firewalls. However, such preventative attempts may not always prove adequate.

For enterprise organizations deploying safety-critical cloud-based software system infrastructure and components, it is important to ensure that enterprise software applications and systems operate in a secure way and are robust and resilient with regard to cyberattacks and related security disruptions performed via a data network.

An enterprise software application security management solution that enables organizations to monitor for critical enterprise security functions and receive real-time notifications regarding waivers potentially associated with security events, both expected and unexpected, on a timely and comprehensive basis results in lessened enterprise disruption and more efficient functioning.

BRIEF DESCRIPTION OF THE DRAWINGS

FIG. 3 illustrates a method of operation, in one example embodiment, of a computing system for rendering security events concurrently with execution of a software application.

DETAILED DESCRIPTION

Figure 1:
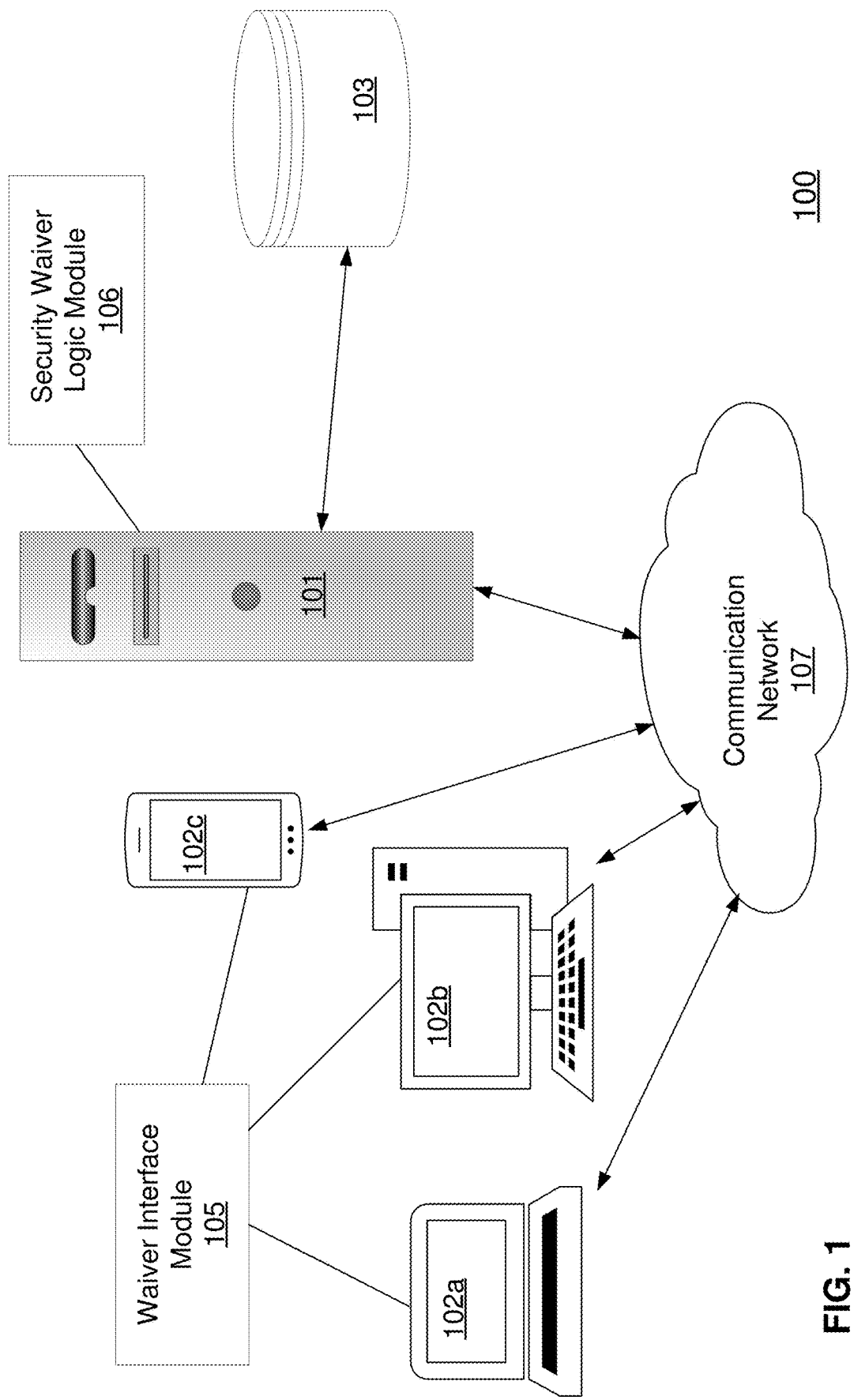
FIG. 1 illustrates, in an example embodiment, a system for software application execution with security waiver notifications to any of a plurality of client computing devices.

Among other technical advantages and benefits, solutions provided herein provide a method and system of timely rendering security events synchronously with progressive software execution. In particular, notification interfaces may be generated based on waiver task automatons executed concurrently with execution of a software. In one embodiment, the notifications generated to authorized ones of client computing devices may present a request for waivers, exceptions, approvals and acknowledgements of security events, in view of existing security policies, generated during execution of the software application. The waiver task automatons may monitor and report in real-time any anomalies in security parameters, relative to expected waiver parameter values and expected trends in waiver parameters given predetermined threshold values or conditions.

In accordance with a first example embodiment, provided is a method of rendering security events in execution of a software application in a communication network. The method comprises receiving, at a memory of the server computing device, a waiver parameter specification identifying at least one waiver parameter in association with at least one recipient client device of the plurality of client computing devices, the at least one waiver parameter based at least in part on an expected security event in the software application execution; during concurrent execution, in a processor of the server computing device, of object code of the software application, generating at least one waiver task automaton that monitors for the at least one waiver parameter; and generating, based on the monitoring, at a client interface of the at least one recipient communication device, a waiver notification interface in accordance with concurrent execution.

In accordance with a second example embodiment, a server computing system that includes a processor and a memory, coupled to a plurality of client computing devices is provided. The memory includes instructions executable to receive, at a memory of the server computing device, a waiver parameter specification identifying at least one waiver parameter in association with at least one recipient client device of the plurality of client computing devices, the at least one waiver parameter based at least in part on an expected security event in the software application execution; during concurrent execution, in a processor of the server computing device, of object code of the software application, generate at least one waiver task automaton that monitors for the at least one waiver parameter; and generate, based on the monitoring, at a client interface of the at least one recipient communication device, a waiver notification interface in accordance with concurrent execution.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device.

Furthermore, one or more embodiments described herein may be implemented through the use of logic instructions that are executable by one or more processors of a computing device, including a server computing device. These instructions may be carried on a computer-readable medium. In particular, machines shown with embodiments herein include processor(s) and various forms of memory for storing data and instructions. Examples of computer-readable mediums and computer storage mediums include portable memory storage units, and flash memory (such as carried on smartphones). A server computing device as described herein utilizes processors, memory, and logic instructions stored on computer-readable medium. Embodiments described herein may be implemented in the form of computer processor-executable logic instructions or programs stored on computer memory mediums.

System Description

FIG. 1 illustrates, in an example embodiment, security waiver logic module 106 hosted at server computing device 101, within communication network system 100 for software application execution with concurrent notifications to client computing devices 102. Database 103 may be communicatively accessible to server computing device 101 (also referred to as server 101 herein) and additionally, to one or more of client computing devices 102 via communication network 107.

Cloud-connected client computing devices 102 may include any of laptop computing device 102, desktop or workstation computing device 102b or mobile computing device 102c, collectively referred to herein as client device(s) 102. Client interface module 105, when executed in a processor of client device 102 in conjunction with execution of security waiver logic module 106 at server 101, may generate a security waiver user interface at client device 102. The security waiver interface may be rendered, in one embodiment, at a screen display user interface of client device 102, whereby waivers or request for process exceptions may be solicited from, or provided to, a user.

Figure 2:
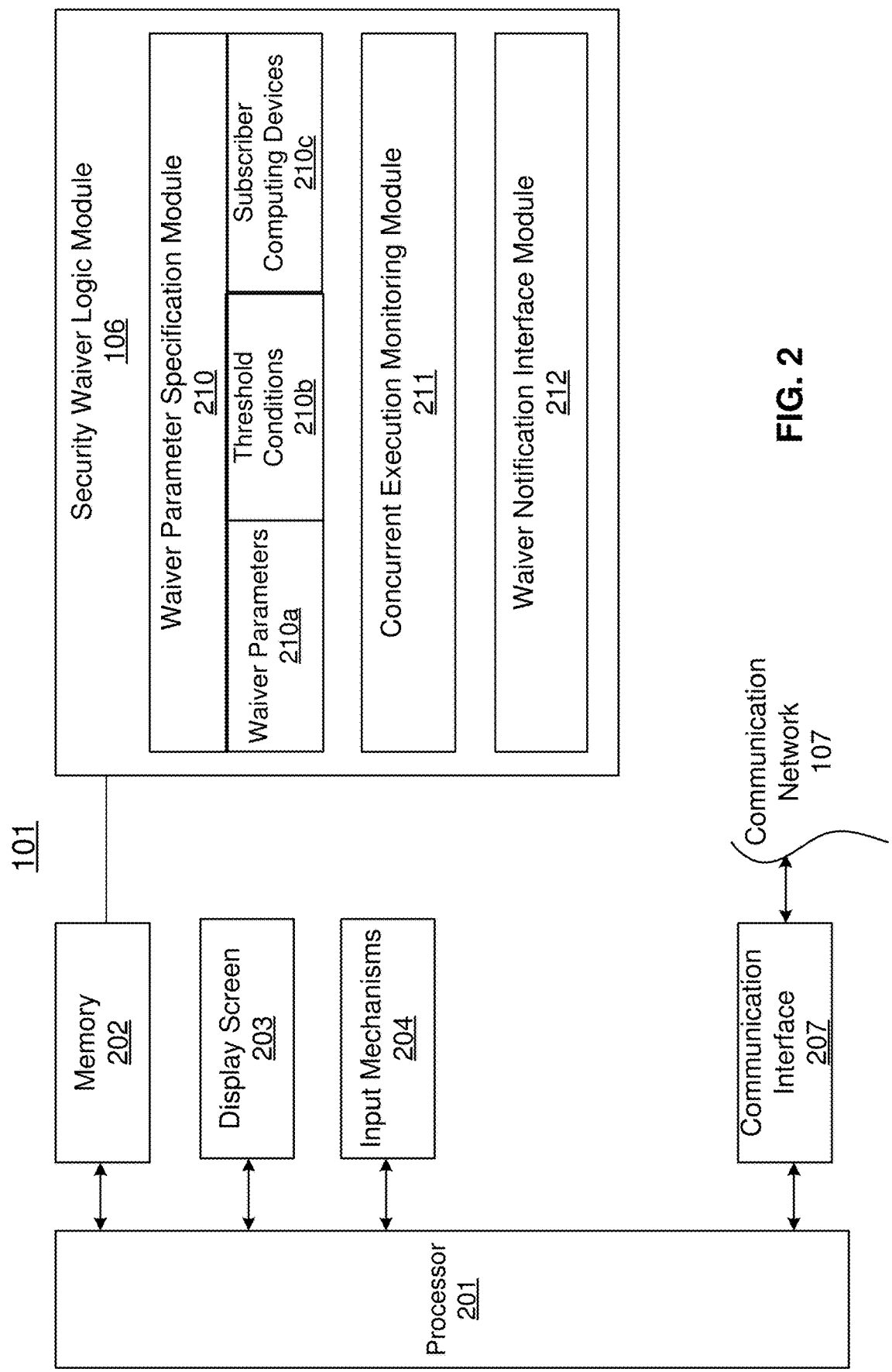
FIG. 2 illustrates, in one example embodiment, an architecture of a server computing system for software application execution with security waiver notification interfaces synchronously generated to any of a plurality of client computing devices.

FIG. 2 illustrates architecture 200 of server computing device 101 hosting security waiver logic module 106, in an example embodiment. Server 101 or other computing system having similar functionality, may include processor 201, non-transitory memory 202 that includes security waiver logic module 106, display screen 203, input mechanisms 204 such as a keyboard or software-implemented touchscreen input functionality, and communication interface 207 for communicating via communication network 107.

Security waiver logic module 106 includes instructions stored in memory 202 of server 101, the instructions configured to be executable in processor 201. Security waiver logic module 106 may comprise portions or sub-modules including waiver parameter specification module 210, concurrent execution monitoring module 211, and waiver notification interface module 212.

Waiver parameter specification module 210 of memory 202 of server computing device 101 may include a specification identifying a software application for execution, certain expected security waiver parameters 210a and threshold values or conditions 210b for the waiver parameters based on execution of the software application in processor 201. Subscriber computing devices 210c may be pre-identified and specified as particular ones of client computing devices 102 selected, permitted or authorized to receive, view, and interact with results pertaining to security waivers in execution of the software application in processor 201 of server computing device 101.

In one embodiment, the specification may include, in addition to waiver parameters and threshold values or conditions, identification of certain recipient client devices 102 associated with the respective waiver parameters in conjunction with addressing details for communication with the recipient client devices.

Security waiver parameters 210a may relate to industry wide and enterprise-specific security policy conditions and parameters associated with security events, both expected and unexpected, in course of software application execution.

Security waiver parameters 210a may be based upon waiver requests from pipeline processing results of application execution. Users can attach multiple security findings to a waiver. Users may optionally broaden a waiver to include more than one environment, and more than a specific server in the communication or enterprise network. Users may also be provided with capability to attach successful pipeline execution results to an existing waiver as evidence that a given security waiver finding has been resolved.

When a violation to a security policy is found, a waiver request may be generated from the security finding. When a user is presented with pipeline execution results, they may have the option to create a new waiver from the security policy violations or add the policy violations to an existing draft waiver, prior to creating a new waiver, or append to an existing waiver, the details of the security findings. Such details may include identification of the impacted system, application, environment, server device, and source code file affected, if applicable, and an application release and or version being developed.

Once a waiver is created, a user add extra details to the waiver specification, such a rationale as why the waiver is being requested or created, a time period (a number of days, until a specific date, or in perpetuity), modify the scope of the waiver beyond the specific findings at a given server to be expanded or extrapolated to any server in the execution production environment. Additional security findings may be added to the waiver request from other pipeline executions and allow for submitting the waiver for approval. When a waiver is approved or denied, a user or users should receive notification and have visibility to look up the verdict or rationale rendered and any comments or notes provided by the approver or reviewer. If a waiver is approved, the security policy violation pertaining thereto may be logged into database 103 memory.

Threshold conditions 210b may relate to threshold security conditions and values to be applied to the security waiver parameters, including values for quantifying or estimating the strength of a security impact if a given waiver is implemented. The threshold value or condition as set for a particular waiver parameter may serve as a constraint, which once exceeded, triggers or initiates generating a waiver notification interface.

Subscriber computing devices 210c may be pre-identified and specified as particular ones of client computing devices 102 selected, permitted or authorized to receive, view, and interact with results pertaining to security waivers in execution of the software application in processor 201 of server computing device 101.

Concurrent execution monitoring module 211 generates, by the processor during execution of the software application, an waiver task automaton representative of waiver parameters, and during concurrent execution of object code of the software application in conjunction with the waiver task automaton, monitors, by the waiver task automaton, for the waiver parameters.

The waiver task automaton as generated at server computing device 101 using waiver task automaton module 106, in an embodiment, is defined by, and constituted of programmable script code including data representative of at least one waiver parameter or value and the threshold condition or value. In one variation, where the specification as created or drafted at client computing device 101 further incudes identification and communication addressing details of third-party recipient communication devices, the script code of the waiver task automaton may further encode data pertaining to the third-party recipient client devices, such that the notifications and requests for waiver may be directed to the recipient client devices. In another variation, the waiver task automaton as constituted or embodied of scripting code may be enabled for application program interface (API) calls to the enterprise software application during concurrent execution therewith at client computing device 102. The scripting code of the waiver task automaton may include data relating to the expected result values along with their respective threshold conditions as specified via waiver parameter specification module 210, in some embodiments.

Specific representations of the waiver task automatons may be selected, in one embodiment, by a user at client computing device 102 from a library of waiver task automatons stored in a memory of database 103 communicatively coupled to server device 101, and modified or customized at client computing device 102 in accordance with the specification including expected waiver parameters and any threshold conditions for the expected waiver parameters, prior to being deployed for concurrent execution with the software application. The specification may further include communication addressing details of particular client devices 102 to which waiver notification interface module 212 may direct communications from the waiver task automaton during concurrent execution at server 101.

Once generated at server computing device 101, the waiver task automaton may be stored in a memory of a database, such as database 103 communicatively accessible to server 101, and made available to users, including users at client computing devices 102, for re-use in conjunction with execution of various third-party software application products, in one embodiment. The waiver task automaton, in such an embodiment, provides customizable 'building blocks' for production execution or software application products, including enterprise software application products based on requirements specified or defined by users of computing devices 102, advantageously eliminating or minimizing the development cost, lead time, and effort in deploying the waiver task automatons for concurrent execution with software applications in a production mode.

In an embodiment, a plurality of waivers automatons may be deployed during execution of an enterprise software security application by processor 201 of server computing device 101. In one embodiment, each waiver task automaton may be configured by individual or unique ID, identify an owner or interested party associated with a waiver, and include an update frequency of security data pertaining thereto, and optionally include a rule used in monitoring waiver parameters as execution of the software application progresses in accordance with various execution states.

Waiver notification module 211 monitors, during the concurrent execution of object code of the software application in conjunction with the waiver task automaton, the waiver parameters relative to their respective threshold condition conditions as specified in accordance with waiver parameter specification module 210.

The waiver task automaton may use access methods to access execution states, interim execution results, as well as final output execution results for the software application under execution. For example, in one embodiment, the waiver task automaton may access one or more results during execution of software application using one or more application program interface (API) calls during the concurrent execution.

Waiver notification interface module 212 enables notifications to the recipient communication devices 102, synchronously generated during the concurrent execution, that any security waiver parameter is lower and higher in value than a preestablished threshold condition or vale, or represents a trend that is outside of an acceptable range of security values or industry security benchmarks. It is contemplated, more broadly, that waiver task automatons described herein may monitor software program execution security results pertaining to trends and aggregate data generated from interim or final software execution results in real-time, or any result that deviates from an expectation based on previous norms, presence or absence of certain waiver parameters or values, and an expectation or confirmation as to whether various execution security files and services exist and are functioning as intended.

The waiver task automaton generates a communication to notify one or more recipient communication devices as specified in accordance with waiver parameter specification module 210 and concurrent execution monitoring module 211 that an important or unusual security event has occurred, such as when a waiver parameter value is out of control or unexpected relative to the predetermined or pre-established threshold conditions. In one embodiment, recipient communication devices may be third-party recipient communication devices that are not be enabled for directly addressing nor accessing the software application under execution at client computing device 102. Recipient communication devices may be selected, for example, the client system or customer's information technology support group or a vendor of the third-party enterprise software application, to receive alerts or notifications. In general, the waiver task automatons provided herein make more certain that waivers generated are up to date and responsive to changed security circumstances in accordance with the software program execution.

In one variation, where the specification further incudes identification of a third-party recipient communication device 102, the script code of the waiver task automaton may further encode data pertaining to the third-party recipient communication device, such that notifications may be directed or communicated to the third-party recipient communication device 102.

In one illustrative embodiment, the specification may include a representation of key security performance indicators (security KPIs) related to software application concurrent execution in conjunction with waiver task automatons The KPIs may be used to establish threshold security values or conditions, such as based on industry security benchmarking or benchmarking customized to a particular enterprise, for monitoring by the waiver automatons during software execution.

Methodology

FIG. 3 illustrates a method 300 of operation, in one example embodiment, of a computing system for rendering security events concurrently with execution of a software application, method 300 being performed by one or more processors 201 of server computing device 101. In describing the example of FIG. 3, reference is made to the examples of FIG. 1 and FIG. 2 for purposes of illustrating suitable components or elements for performing a step or sub-step being described.

Examples of method steps described herein relate to the use of client computing device 102 including security waiver logic module 106 for implementing the techniques described. According to one embodiment, the techniques are performed by client computing device 102 in response to the processor 201 executing one or more sequences of software logic instructions that constitute security waiver logic module 106. In embodiments, security waiver logic module 106 may include the one or more sequences of instructions within sub-modules including waiver parameter specification module 210, concurrent execution monitoring module 211, and waiver notification interface module 212. Such instructions may be read into memory 202 from machine-readable medium, such as memory storage devices. In executing the sequences of instructions contained in waiver parameter specification module 210, concurrent execution monitoring module 211, and waiver notification interface module 212 of security waiver logic module 106 in memory 202, processor 201 performs the process steps described herein. In alternative implementations, at least some hardwired circuitry may be used in place of, or in combination with, the software logic instructions to implement examples described herein. Thus, the examples described herein are not limited to any particular combination of hardware circuitry and software instructions. Additionally, it is also contemplated that in alternative embodiments, the techniques herein, or portions thereof, may be distributed between the computing devices 102 and server computing device 101. For example, computing devices 102 may perform some portion of functionality described herein with regard to various modules of which security waiver logic module 106 is comprised, and transmit data to server 101 that, in turn, performs at least some portion of the techniques described herein.

At step 310, processor 201 executes instructions of waiver parameter specification module 210 to receive, at a memory 202 of the server computing device 101, a waiver parameter specification identifying at least one waiver parameter in association with at least one recipient client device of the plurality of client computing devices 102, the at least one waiver parameter based at least in part on an expected security event in the software application execution.

In one embodiment, the specification may include waiver parameters, threshold values or conditions and identification of recipient client devices for receiving notifications in conjunction with addressing details for communication with the recipient client devices. As described herein, individual ones of laptop, desktop or workstation, and mobile client computing devices 102*a-c* as depicted in FIG. 1 may be collectively referred to as client computing device 102. Recipient communication devices may be specified, at waiver parameter specification module 210, as any one of more of client computing devices 102.

In one embodiment, the software application comprises a enterprise software security application, and the waiver parameters with threshold value values established pertain to one or more of software and system security benchmarks, a security performance indicator (KPI) value.

At step 320, processor 201 of server computing device 101 executes instructions included in concurrent execution monitoring module 211 to, during concurrent execution of object code of the software application, generate at least one waiver task automaton that monitors for the at least one waiver parameter.

The waiver task automaton as generated at server computing device 101 using concurrent execution monitoring module 211 of waiver task automaton module 106, in an embodiment, is defined by programmable script code including data relating to one or more expected result values and the threshold values or conditions. In one variation, the script code of the waiver task automaton may further encode data pertaining to the third-party recipient computing devices 102, such that notification transmissions may be directed to the recipient devices. In another variation, the waiver task automaton as constituted or embodied of scripting code may be enabled for application program interface (API) calls to the enterprise software application during concurrent execution therewith at client computing device 102. The scripting code of the waiver task automaton may include data relating to the expected result values along with their respective threshold conditions as specified via waiver parameter specification module 210, in some embodiments.

The waiver task automaton, in another embodiment, may be configured at server device 101, at least in part based on a library of waiver task automatons stored in a memory of database 103 communicatively coupled to server device 101, in accordance with the specification including expected waiver parameters and any threshold values for the waiver parameters, prior to being deployed for concurrent execution with the software application. The specification may further include communication addressing details of recipient communication devices to which waiver notification interface module 212 may direct communications from the waiver task automaton during the concurrent execution.

Once generated at server computing device 101, the waiver task automaton may be stored in a memory of a database, such as database 103 communicatively accessible to server 101, and made available for re-use in conjunction with execution of software security services application products.

Still in regard to step 320, processor 201 executes instructions included in concurrent execution monitoring module 211, to monitor, during concurrent execution, in the processor, of object code of the software application in conjunction with the waiver task automaton, by the waiver task automaton, for waiver parameters. The monitoring may be accomplished, in one embodiment, using application program interface (API) calls to the software application during the concurrent execution.

The waiver task automaton may use access methods to access execution states, interim execution results, as well as final output execution results for the software application under execution. For example, in one embodiment, the waiver task automaton may access one or more results during execution of software application using one or more application program interface (API) calls during the concurrent execution.

The threshold values or conditions, in one embodiment, provide basis for deciding whether to transmit one or more waiver parameters to a client interface of client devices 102 for waiver when a value of the security waiver parameter is either lower or higher than a threshold value for the result parameter as established in the specification via waiver parameter specification module 210.

At step 330, processor 201 executes instructions included in waiver notification interface module 212, to generate, based on the monitoring, a waiver notification interface in accordance with concurrent execution to client interface 105 of specific authorized client devices of the recipient communication devices 102.

The waiver task automaton transmits a communication or notification to notify one or more recipient communication devices as specified in accordance with waiver parameter specification module 210 and concurrent execution monitoring module 211 that a security related exception has occurred or a security parameter breached, such as a security parameter value being out of control or unexpected relative to the pre-established threshold conditions or KPI values.

The notification transmission may solicit an waiver of the result parameter at the client interface of recipient device 102. A user at a client interface of recipient client device 102 may be presented with the option to provide anyone or more of an waiver, a dis-waiver or dispute, a modification to the threshold value, or another acknowledgement action regarding the notification received thereon from waiver notification interface module 212 of server device 101.

In one embodiment, the waiver may relate to a security policy violation or anticipated violation.

Upon generation of a waiver, such as at a client interface on a display screen of recipient device 102, the waiver may be transmitted to memory 101 of the server computing device 101, wherein the memory maintains a database record of all waivers associated with the security policy violation or anticipated security policy violation.

In another variation of the waiver, the user at client device 102 may also modify or dispute the waiver or security event based upon the waiver notification, again with a similar result of the modification or dispute being transmitted to memory 101 of the server computing device 101, wherein the memory maintains a database record of a waiver and any associated modifications with security policy concern or violation.

It is contemplated for embodiments described herein to extend to individual elements and concepts described herein, independently of other concepts, ideas or system, as well as for embodiments to include combinations of elements in conjunction with combinations of steps recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mention of the particular feature. Thus, the absence of describing combinations should not preclude the inventors from claiming rights to such combinations.

What is claimed is:

1. A method of rendering a security event in software application execution in a server computing device communicatively coupled to a plurality of client computing devices across a communication network, the method comprising:
    receiving, at a memory of the server computing device, a waiver parameter specification identifying at least one waiver parameter in association with at least one recipient client device of the plurality of client computing devices, the at least one waiver parameter based at least in part on detecting a security violation event in accordance with a set of predetermined security policy violations during the software application execution;
    during concurrent execution, in a processor of the server computing device, of object code of the software application, generating at least one waiver task automaton that monitors for the at least one waiver parameter in accordance with the security violation event; and
    generating, based on the monitoring, for transmission to a client interface of the at least one recipient communication device, a waiver notification interface rendered at a screen display of the client interface during the concurrent execution, the waiver notification interface presenting an option to create a new waiver in accordance with the set of security policy violations and providing capability for attaching evidence including at least a set of successful pipeline execution results that the security violation event has been resolved, the waiver notification interface being generated upon the waiver parameter exceeding a threshold value of the waiver parameter as established in the specification or varying from a prior waiver parameter value in a prior execution of the software application, wherein the threshold value pertains to at least one of an industry security benchmark value, and a security performance indicator (security KPI) value.

2. The method of claim 1 wherein the software application comprises an enterprise software application.

3. The method of claim 1 wherein the client interface of the at least one recipient client device is configured to render at least one of: the new waiver, a modification to the waiver parameter, and an acknowledgement action for enactment thereon.

4. The method of claim 1 wherein the new waiver relates to an anticipated security policy violation.

5. The method of claim 4 wherein the recipient client device comprises at least one of a laptop computing device, a workstation computing device and a mobile computing device.

6. The method of claim 5 further comprising transmitting the waiver to a memory of the server computing device, wherein the memory maintains a record of waivers and modifications thereto.

7. The method of claim 1 wherein the waiver task automaton is defined by script code that includes data relating to the at least one waiver parameter and a threshold value associated with the at least one waiver parameter.

8. The method of claim 7 wherein the script code further includes data pertaining to the at least one recipient communication device, and the monitoring comprises at least one application program interface (API) call to the software application during the concurrent execution.

9. A server computing system coupled to a plurality of client computing devices in a communication network, the server computing system comprising:
    a processor;
    a memory storing a set of instructions, the instructions executable in the processor to:
        receive, at a memory of the server computing device, a waiver parameter specification identifying at least one waiver parameter in association with at least one recipient client device of the plurality of client computing devices, the at least one waiver parameter based at least in part on detecting a security violation event in accordance with a set of predetermined security policy violations during the software application execution;
        during concurrent execution, in a processor of the server computing device, of object code of the software application, generate at least one waiver task automaton that monitors for the at least one waiver parameter in accordance with the security violation event; and
        generate, for transmission to a client interface of the at least one recipient communication device, a waiver notification interface rendered at a screen display of the client interface during the concurrent execution, the waiver notification interface presenting an option to create a new waiver in accordance with the set of security policy violations and providing capability for attaching evidence including at least a set of successful pipeline execution results that the security violation event has been resolved, the waiver notification interface being generated upon the waiver parameter exceeding a threshold value of the waiver parameter as established in the specification or varying from a prior waiver parameter value in a prior execution of the software application, wherein the threshold value pertains to at least one of an industry security benchmark value, and a security performance indicator (security KPI) value.

10. The system of claim 9 wherein the software application comprises an enterprise software application.

11. The system of claim 9 wherein the client interface of the at least one recipient client device is configured to render at least one of: the new waiver, a modification to the waiver parameter, and an acknowledgement action for enactment thereon.

12. The system of claim 9 wherein the new waiver relates to an anticipated security policy violation.

13. The system of claim 12 wherein the recipient client device comprises at least one of a laptop computing device, a workstation computing device and a mobile computing device.

14. The system of claim 9 further comprising instructions executable to transmit the waiver to a memory of the server computing device, wherein the memory maintains a record of waivers and modifications thereto.

15. The system of claim 9 wherein the waiver task automaton is defined by script code that includes data relating to the at least one waiver parameter and a threshold value associated with the at least one waiver parameter.

16. The system of claim 15 wherein the script code further includes data pertaining to the at least one recipient communication device, and the monitoring comprises at least one application program interface (API) call to the software application during the concurrent execution.

* * * * *